United States Patent
Liao et al.

(10) Patent No.: US 9,975,565 B1
(45) Date of Patent: May 22, 2018

(54) HEIGHT-ADJUSTABLE CART

(71) Applicants: Ying-Chieh Liao, Taichung (TW);
Yu-Kuo Liao, Taichung (TW)

(72) Inventors: Ying-Chieh Liao, Taichung (TW);
Yu-Kuo Liao, Taichung (TW)

( * ) Notice: Subject to any disclaimer, the term of this patent is extended or adjusted under 35 U.S.C. 154(b) by 0 days. days.

(21) Appl. No.: 15/583,029

(22) Filed: May 1, 2017

(51) Int. Cl.
*B62B 3/02* (2006.01)

(52) U.S. Cl.
CPC ............ *B62B 3/02* (2013.01); *B62B 2205/20* (2013.01); *B62B 2205/32* (2013.01); *B62B 2206/06* (2013.01)

(58) Field of Classification Search
CPC ................ B62B 3/00; B62B 3/02; A01G 9/02
See application file for complete search history.

(56) References Cited

U.S. PATENT DOCUMENTS 2,604,334 A * 7/1952 Schultz .................... B62B 3/02
108/147.19

2013/0319488 A1 * 12/2013 Chiu ......................... A61H 3/00
135/67

FOREIGN PATENT DOCUMENTS

TW          I555616          11/2016

* cited by examiner

*Primary Examiner* — John D Walters
*Assistant Examiner* — James J Triggs
(74) *Attorney, Agent, or Firm* — Muncy, Geissler, Olds & Lowe, P.C.

(57) ABSTRACT

A height-adjustable cart is provided, including: a cart frame, having two first retractable rods which are disposed diagonally and two second retractable rods which are disposed diagonally, each of the first and second retractable rods having an upper rod and a lower rod which is retractably connected with the upper rod; two resilient engaging members, resiliently releasably positioning the upper rod and the lower rod of the two first retractable rods, respectively; two positioning members, removably connecting the upper rod and the lower rod of the two second retractable rods, respectively; at least one tray, connected with the first retractable rods and the second retractable rods.

7 Claims, 3 Drawing Sheets

HEIGHT-ADJUSTABLE CART

BACKGROUND OF THE INVENTION

Field of the Invention

The present invention relates to a height-adjustable cart.

Description of the Prior Art

In every field of the work such as a manufacturing, a repair industry, a hair industry, or other fields of the work, usually uses various tools such as air tools, parts, and hand tools. Generally, for moving easily and sorting various tools, it needs the cart which is capable of loading various tools.

The conventional cart, such as TW I555616, includes a plurality rods, a plurality securing blocks, a plurality trays, and a plurality wheel bodies; four corners of each trays have four first securing portions respectively, four first securing portions of each trays are connected with the four rods respectively. However, the conventional cart must be assembled or disassembled at least one rod thereto vertically to proper height when adjusting the height of the cart. Besides, the conventional cart must be disassembled at least one of the trays off the four rods to adjust the height by one-person operation. Therefore the conventional cart has a complex process and time-consuming problem for adjusting height.

The present invention has arisen to mitigate and/or obviate the afore-described disadvantages.

SUMMARY OF THE INVENTION

The major object of the present invention is to provide a height-adjustable cart, which is easy to adjust the height by one-person operation.

To achieve the above and other objects, a height-adjustable cart is provided, including: a cart frame, having two first retractable rods which are disposed diagonally and two second retractable rods which are disposed diagonally, each of the first and second retractable rods having an upper rod and a lower rod which is retractably connected with the upper rod; two resilient engaging members, resiliently releasably positioning the upper rod and the lower rod of the two first retractable rods, respectively; two positioning members, removably connecting the upper rod and the lower rod of the two second retractable rods, respectively; at least one tray, connected with the first retractable rods and the second retractable rods.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
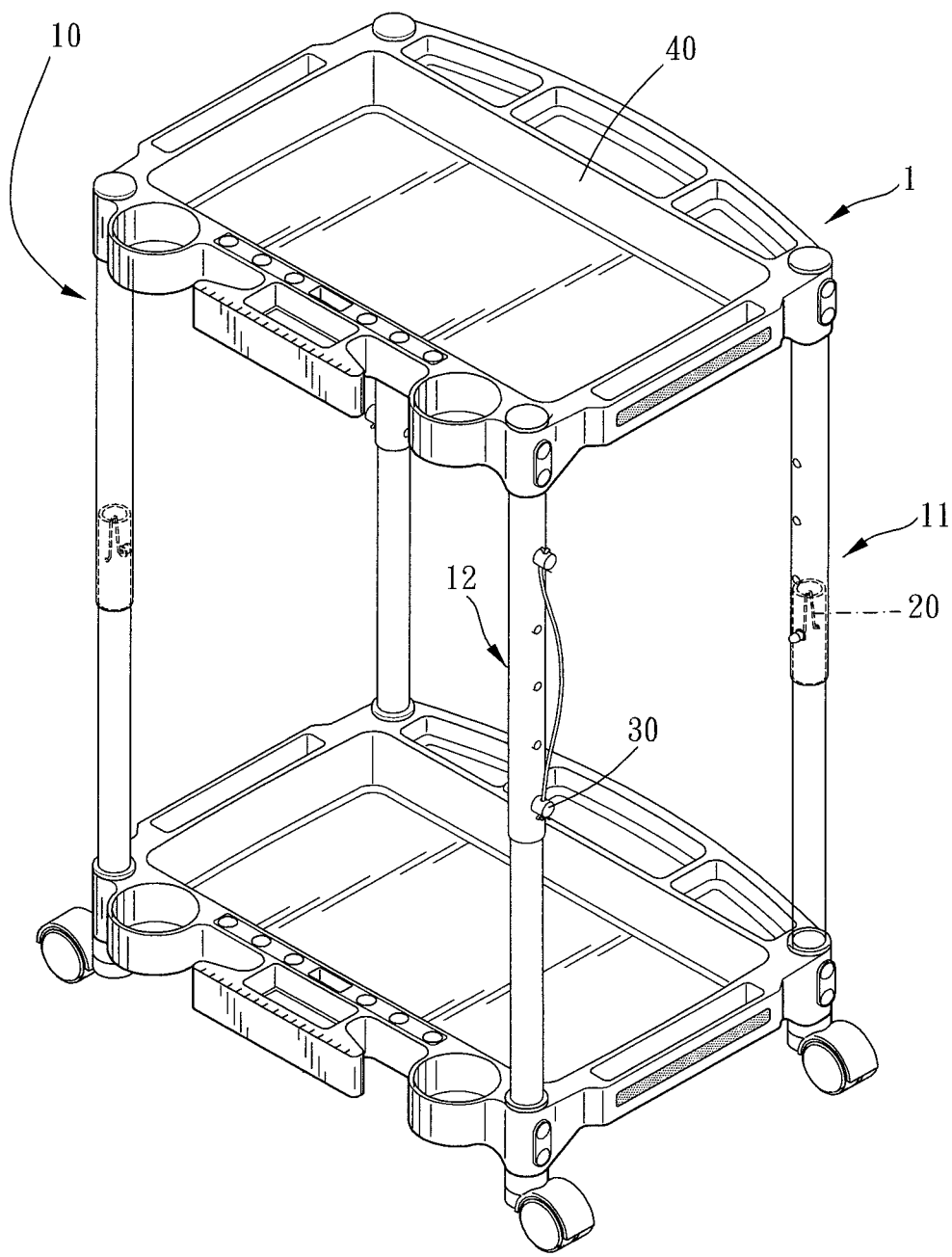
FIG. 1 is a stereogram of the present invention.
Figure 2:
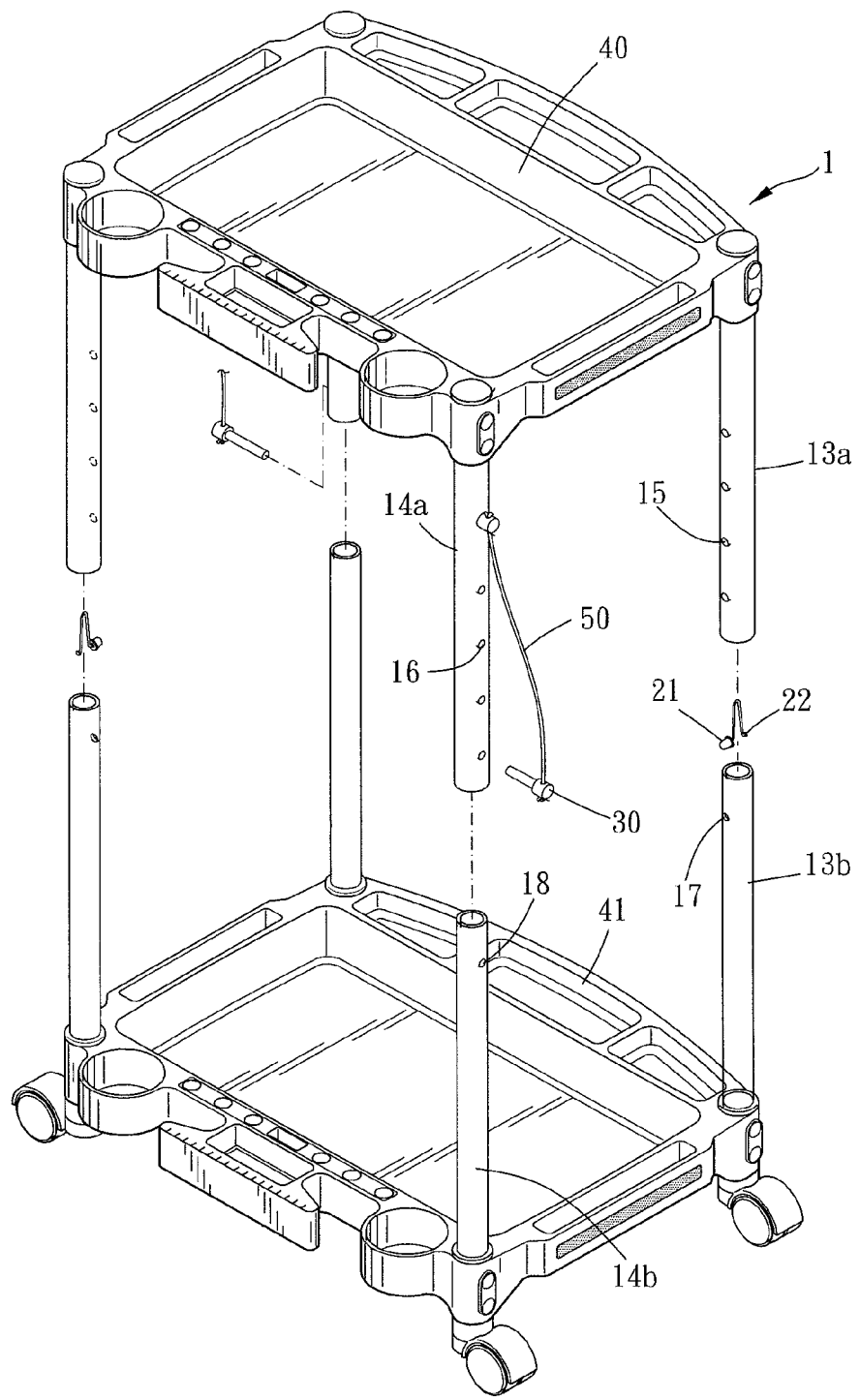
FIG. 2 is a breakdown view of the present invention.
Figure 3:
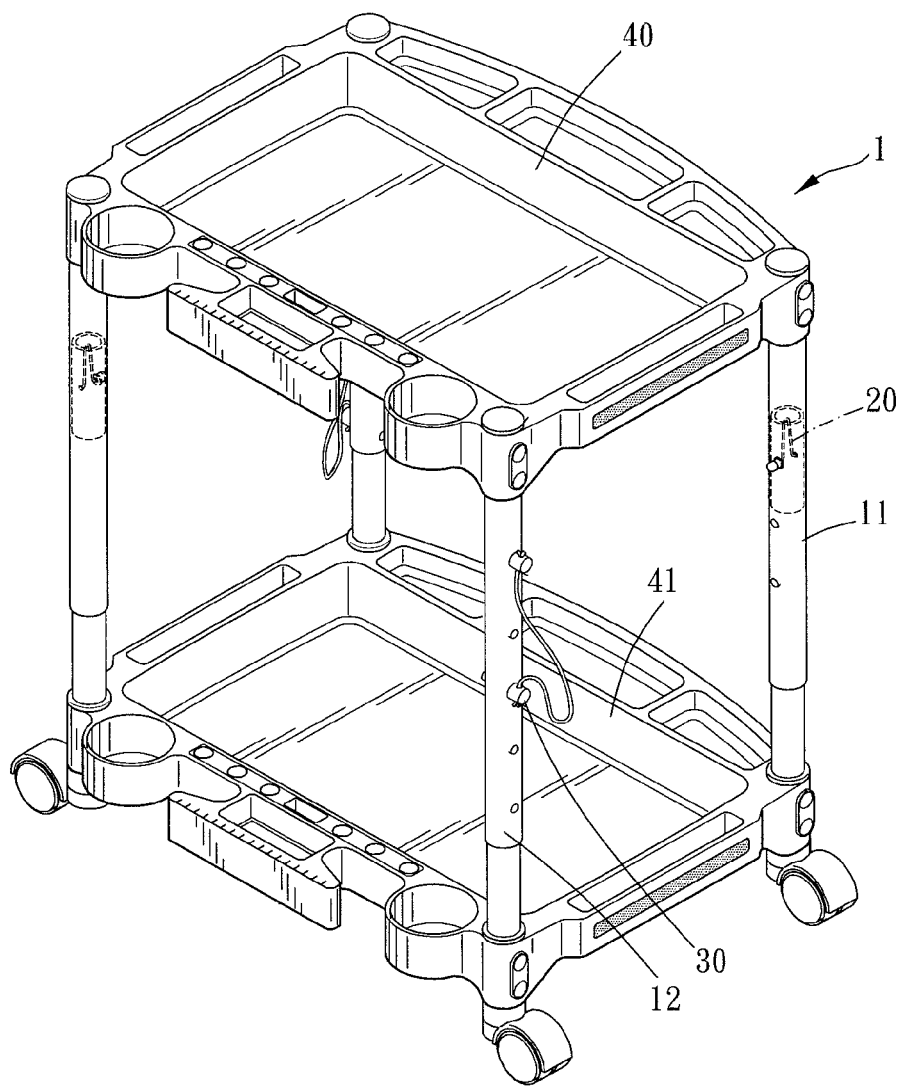
FIG. 3 is the drawing showing the present invention in operation.

Please refer to FIGS. 1 and 3 for a preferred embodiment of the present invention, a height-adjustable cart 1 includes a cart frame 10, two resilient engaging members 20, two positioning members 30 and at least one tray 40.

The cart frame 10 has two first retractable rods 11 which are disposed diagonally and two second retractable rods 12 which are disposed diagonally, each of the first and second retractable rods 11, 12 have an upper rod 13a, 14a and a lower rod 13b, 14b which is retractably connected with the upper rod 13a, 14a; the two resilient engaging members 20 resiliently releasably positioning the upper rod 13a and the lower rod 13b of the two first retractable rods 11, respectively; the two positioning members 30 removably connecting the upper rod 14a and the lower rod 14b of the two second retractable rods 12, respectively; the at least one tray 40 is connected with the first retractable rods 11 and the second retractable rods 12. Therefore, it is easy for adjusting the height of the cart frame 10 fast and stable by one-person operation.

A number of the at least one tray 40 can be plural, in this embodiment, a number of the at least one tray 40 has two trays 40, 41, one of the trays 40 is connected with the upper rod 13a, 14a of each of the first and second retractable rods 11, 12, the other tray 41 is connected with the lower rod 13b, 14b of each of the first and second retractable rods 11, 12, so as to adjust the height of the tray 40. In other embodiments, the upper rod 13a, 14a or the lower rod 13b, 14b of each of the first and second retractable rods 11, 12 can be disposed the plurality of trays.

The upper rod 13a, 14a and the lower rod 13b, 14b of each of the first and second retractable rods 11, 12 are tubular members and retractably telescoped, in other embodiments can be a sheet body, or other members which can be corresponding to move retractably to each other. The upper rod 13a, 14a and the lower rod 13b, 14b of each of the first and second retractable rods 11, 12 can be a round tube, a square tube, or any other shape of tube respectively, in this embodiment the upper rod 13a, 14a and the lower rod 13b, 14b of each of the first and second retractable rods 11, 12 are the round rods respectively, so as to preferably movably connect with each other.

One of the upper rod 13a, 14a and the lower rod 13b, 14b of each of the first and second retractable rods 11, 12 has a plurality of positioning holes 15, 16 and the other has a through hole 17, 18 which is optionally corresponding to one of the plurality positioning holes 15, 16. In this embodiment, the upper rod 13a, 14a of each of the first and second retractable rods 11, 12 has a plurality of positioning holes 15, 16, the lower rod 13b, 14b of each of the first and second retractable rods 11, 12 has a through hole 17, 18 which is optionally corresponding to one of the plurality positioning holes 15, 16.

Each resilient engaging members 20 is positioned at the upper rod 13a of the two first retractable rod 11 and inserted into one of the plurality of positioning holes 15 and a through hole 17. Therefore, it is capable of pressing each of the two resilient engaging members 20 out of one of the plurality of positioning holes 15 of the two first retractable rod 11, so as to release secured statement thereof. On the contrary, the upper rod 13a and the lower rod 13b of each of the two first retractable rods 11 can be positioned with each other through the resilient engaging members 20 and resiliently insert into one of the plurality of positioning holes 15 of each of the two first retractable rods 11 and the through hole 17. In this embodiment, each of the two resilient engaging members 20 is a V-shaped buckle. Each of the two resilient engaging members 20 includes a buckle head 21 which is releasably inserted into the through hole 17 and one of the plurality of positioning holes 15, and a positioning portion 22 which is positioned at the upper rod 13a or the lower rod 13b. Preferably, the buckle head 21 of each of the two resilient engaging members 20 is a convex column; the positioning portion 22 of each of the two resilient engaging members 20 is an abutting surface. In this embodiment the abutting surface abuts the lower rod 13b of each of the two first retractable rods 11. Preferably, each of the two resilient engaging members 20 is protruding out of one of the plurality of positioning holes, so as to provide outer force (such as hands) to effect thereon.

Each of the two positioning members 30 can be removebly inserted into one of the plurality of positioning holes 16 and the through hole 18 of the lower rod 14b of each of the two second retractable rods 12 respectively, so as to release the positioning statement of the upper rod 14a and the lower rod 14b of each of the two second retractable rods 12. On the contrary, insert each of the two positioning members 30 into the upper rod 14a and lower rod 14b of each of the two second retractable rods 12 to position two elements above to each other. In this embodiment, each of the two positioning members 30 is a pin for assembling and disassembling fast to one of the plurality positioning holes 16 and the through hole 18. In other embodiments, each of the two positioning members 30 can be a threaded rod, and each of the plurality positioning holes 16 and the through hole 18 of each of the two second retractable rods 12 can be a screw hole which is corresponding to the threaded rod.

The height-adjustable cart 1 further including two connecting members 50, wherein each of the two connecting members 50 is connected with the cart frame 10 and one of the two positioning members 30, each of the two connecting members 50 can be a rope, a chain, etc. to connect with the cart frame 10 by the method of fastening or locking, so as to keep each of the two connecting members 50 and the cart frame 10 in connecting statement. In this embodiment, each of the two connecting members 50 is binding to the upper rod 14a of each of the two second retractable rods 12. In other embodiments, each of the two connecting members 50 can be binding to one of the trays 40 or the lower rod 14b of each of the two second retractable rods 12.

In use, when operating the height-adjustable cart 1 by one person, disassemble each of the two positioning members 30 out of one of the plurality of positioning holes 16 and the through hole 18 of each of the two second retractable rods 12 at first, then press each of the two resilient members 20 out of one of the plurality of positioning holes 15 and the through hole 17 of each of the two first retractable rods 11 at the same time, and continue to adjust at least one tray 40 to the proper height; last, release each of the two resilient members 20, and let each of the two resilient members 20 be inserted into one of the plurality of positioning holes 15 and the through hole 17. Therefore, it is provide easy, fast and stable operation for adjusting the height of the height-adjustable cart 1 by one-person operation.

While we have shown and described various embodiments in accordance with the present invention, it should be clear to those skilled in the art that further embodiments may be made without departing from the scope of the present invention.

What is claimed is:
1. A height-adjustable cart, including:
a cart frame, having two first retractable rods which are disposed diagonally and two second retractable rods which are disposed diagonally, each of the first and second retractable rods having an upper rod and a lower rod which is retractably connected with the upper rod;
two resilient engaging members, resiliently releasably positioning the upper rod and the lower rod of the two first retractable rods, respectively;
two positioning members, removably connecting the upper rod and the lower rod of the two second retractable rods, respectively;
at least one tray, connected with the first retractable rods and the second retractable rods;
wherein each of the two resilient engaging members is a V-shaped buckle;
wherein one of the upper rod and the lower rod of each of the two first retractable rods has a plurality of positioning holes and the other has a through hole which is optionally corresponding to one of the plurality of positioning holes, each of the two resilient engaging members includes a buckle head which is releasably inserted into the through hole and one of the plurality of positioning holes, and a positioning portion which is positioned at the upper rod or the lower rod.

2. The height-adjustable cart of claim 1, wherein the upper rod and the lower rod of each of the two first retractable rods are tubular members and retractably telescoped.

3. The height-adjustable cart of claim 1, wherein one of the upper rod and the lower rod of each of the two second retractable rods has a plurality of positioning holes and the other has a through hole which is optionally corresponding to one of the plurality of positioning holes, each of the positioning members is removably inserted into the through hole and one of the plurality of positioning holes.

4. The height-adjustable cart of claim 1, wherein the upper rod and the lower rod of each of the two second retractable rods are tubular members and retractably telescoped.

5. The height-adjustable cart of claim 1, further including two connecting members, wherein each of the two connecting members is connected with the cart frame and one of the two positioning members.

6. The height-adjustable cart of claim 1, wherein each of the two positioning members is a pin.

7. A height-adjustable cart, including:
a cart frame, having two first retractable rods which are disposed diagonally and two second retractable rods which are disposed diagonally, each of the first and second retractable rods having an upper rod and a lower rod which is retractably connected with the upper rod;
two resilient engaging members, resiliently releasably positioning the upper rod and the lower rod of the two first retractable rods, respectively;
two positioning members, removably connecting the upper rod and the lower rod of the two second retractable rods, respectively;
at least one tray, connected with the first retractable rods and the second retractable rods;
wherein one of the upper rod and the lower rod of each of the two first retractable rods has a plurality of positioning holes and the other has a through hole which is optionally corresponding to one of the plurality of positioning holes, each resilient engaging members is positioned at one of the upper rod and the lower rod and inserted into the through hole and one of the plurality of positioning holes;

wherein a number of the at least one tray is two, one of the trays is connected with the upper rod of each of the first and second retractable rods, the other tray is connected with the lower rod of each of the first and second retractable rods; the upper rod and the lower rod of each of the first and second retractable rods are tubular members and telescoped; the upper rod of each of the two second retractable rods has the plurality of positioning holes, the lower rod of the each of the two second retractable rods has the through hole which is optionally corresponding to one of the plurality of positioning holes, each of the positioning members is removably inserted into the through hole and one of the plurality of positioning holes; each of the two resilient engaging members is a V-shaped buckle and disposed in the lower rod of one of the two first retractable rods; each of the two resilient engaging members includes a buckle head which is releasably inserted into the through hole and one of the plurality of positioning holes, and a positioning portion which is positioned at the upper rod or the lower rod; the buckle head of each of the two resilient engaging members is a convex column, the positioning portion of each resilient engaging members is an abutting surface, each of the two resilient engaging members is protruding out of one of the plurality of positioning holes; the height-adjustable cart further includes two connecting members, wherein each of the two connecting members is connected with the cart frame and one of the two positioning members; each of the two positioning members is a pin.

* * * * *